US012377673B2

(12) United States Patent
Wang et al.

(10) Patent No.: US 12,377,673 B2
(45) Date of Patent: Aug. 5, 2025

(54) LINKAGE MECHANISM FOR OPENING AND CLOSING AN INPUTTING TRAY AND AN OUTPUTTING TRAY TOGETHER

(71) Applicant: Foxlink Image Technology Co., Ltd., New Taipei (TW)

(72) Inventors: Kuo Shing Wang, New Taipei (TW); Pai Hsien Su, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 188 days.

(21) Appl. No.: 18/485,316

(22) Filed: Oct. 12, 2023

(65) Prior Publication Data

US 2024/0217248 A1 Jul. 4, 2024

(30) Foreign Application Priority Data

Jan. 4, 2023 (CN) ......................... 202320040073.8

(51) Int. Cl.
*B65H 1/04* (2006.01)
*B41J 13/10* (2006.01)
*B65H 31/20* (2006.01)

(52) U.S. Cl.
CPC ........... *B41J 13/103* (2013.01); *B41J 13/106* (2013.01); *B65H 1/04* (2013.01); *B65H 31/20* (2013.01); *B65H 2405/1117* (2013.01); *B65H 2405/115* (2013.01); *B65H 2405/3321* (2013.01)

(58) Field of Classification Search
CPC . B65H 1/04; B65H 1/00; B65H 31/00; B65H 2405/3321
See application file for complete search history.

(56) References Cited

U.S. PATENT DOCUMENTS

| | | | | |
|---|---|---|---|---|
| 7,258,334 | B2 * | 8/2007 | Cheng | B41J 13/106 271/3.14 |
| 9,771,233 | B2 * | 9/2017 | Miura | B65H 31/02 |
| 10,913,629 | B2 * | 2/2021 | Yoshita | H04N 1/00519 |
| 12,049,375 | B2 * | 7/2024 | Tateishi | G03G 15/6529 |
| 2003/0173402 | A1 * | 9/2003 | Ogawa | B65H 31/00 235/381 |
| 2005/0116406 | A1 * | 6/2005 | Cheng | B41J 13/106 271/3.14 |
| 2016/0090260 | A1 * | 3/2016 | Miura | B65H 1/04 271/3.14 |
| 2022/0127090 | A1 * | 4/2022 | Tateishi | G03G 15/6511 |

* cited by examiner

*Primary Examiner* — Patrick Cicchino

(57) ABSTRACT

A linkage mechanism for opening and closing an inputting tray and an outputting tray together includes a base, an outputting tray which includes an intermediate outputting tray pivotally connected to a rear of the base, and a terminal outputting tray pivotally connected to a tail end of the intermediate outputting tray, an inputting tray pivotally connected to a top of the base, at least one first linkage bar and at least one second linkage bar. Two ends of the at least one first linkage bar are pivotally connected to one side of the inputting tray and one side of the intermediate outputting tray, respectively. Two ends of the at least one second linkage bar are pivotally connected to one side of the base and one side of the terminal outputting tray, respectively.

20 Claims, 20 Drawing Sheets

LINKAGE MECHANISM FOR OPENING AND CLOSING AN INPUTTING TRAY AND AN OUTPUTTING TRAY TOGETHER

CROSS-REFERENCE TO RELATED APPLICATION

The present application is based on, and claims priority from, China Patent Application No. 202320040073.8, filed Jan. 4, 2023, the disclosure of which is hereby incorporated by reference herein in its entirety.

BACKGROUND OF THE INVENTION

1. Field of the Invention

The present invention generally relates to a linkage mechanism for opening and closing an inputting tray and an outputting tray, and more particularly to a linkage mechanism for opening and closing an inputting tray and an outputting tray together, the linkage mechanism for opening and closing an inputting tray and an outputting tray together links the inputting tray and the outputting tray so as to ensure that the inputting tray is opened or closed along with the outputting tray.

2. The Related Art

In order to improve an efficiency of processing documents, many document processing machines are provided with automatic document feeders. A conventional automatic document feeder includes an inputting tray and an outputting tray. The inputting tray is used for stacking the documents to be scanned or printed by a user, so that the documents are fed automatically. The outputting tray is used for storing the fed documents. When the conventional automatic document feeder is mounted to a portable transaction machine, and the portable transaction machine is carried, the inputting tray and the outputting tray of the automatic document feeder are folded to reduce an overall volume of the portable transaction machine, and tail ends of the inputting tray and the outputting tray are generally provided with an additional foldable extension element.

However, the inputting tray, the outputting tray and the extension element in the conventional automatic document feeder need be manually opened and closed, so inconveniences are brought to the user in use.

Therefore, it is necessary to provide a linkage mechanism for opening and closing an inputting tray and an outputting tray together, the linkage mechanism for opening and closing the inputting tray and the outputting tray together links the inputting tray and the outputting tray so as to ensure that the inputting tray is opened or closed along with the outputting tray, when a user opens or closes the inputting tray, the outputting tray of the linkage mechanism for opening and closing the inputting tray and the outputting tray together are consecutively opened or closed.

SUMMARY OF THE INVENTION

An object of the present invention is to provide a linkage mechanism for opening and closing an inputting tray and an outputting tray together, the linkage mechanism for opening and closing the inputting tray and the outputting tray together links the inputting tray and the outputting tray so as to ensure that the inputting tray is opened and closed along with the outputting tray. The linkage mechanism for opening and closing the inputting tray and the outputting tray together includes a base, an outputting tray which includes an intermediate outputting tray pivotally connected to a rear of the base, and a terminal outputting tray pivotally connected to a tail end of the intermediate outputting tray, an inputting tray pivotally connected to a top of the base, at least one first linkage bar linked between the intermediate outputting tray and the inputting tray, and at least one second linkage bar linked between the base and the terminal outputting tray. Two ends of the at least one first linkage bar are pivotally connected to one side of the inputting tray and one side of the intermediate outputting tray, respectively. Two ends of the at least one second linkage bar are pivotally connected to one side of the base and one side of the terminal outputting tray, respectively. The inputting tray has a cam portion extended from a bottom of the inputting tray. The cam portion has a rotating shaft pivotally connected to the top of the base. An arc groove is formed next to the rotating shaft. A sliding path of the arc groove is coaxial with the rotating shaft, and one end of the at least one first linkage bar is slidable and is rotatably connected in the arc groove.

Another object of the present invention is to provide a linkage mechanism for opening and closing an inputting tray and an outputting tray together. The linkage mechanism for opening and closing the inputting tray and the outputting tray together includes a base, an outputting tray which is a terminal outputting tray rotatably connected to a rear of the base, an inputting tray pivotally connected to a top of the base, at least one first linkage bar linked between the inputting tray and the terminal outputting tray, at least one second linkage bar linked between the base and the terminal outputting tray, and an ejecting extension element disposed to the terminal outputting tray. Two ends of the at least one first linkage bar are pivotally connected to one side of the inputting tray and one side of the terminal outputting tray, respectively. Two ends of the at least one second linkage bar are pivotally connected to one side of the base and the one side of the terminal outputting tray, respectively. The ejecting extension element includes a first extension board slidably disposed to the terminal outputting tray, a first gliding groove defined in the first extension board, a slider slidably disposed to the terminal outputting tray, a connecting bar and a first swinging arm. A sliding path of the first extension board is perpendicular to a pivot axis of the base and the terminal outputting tray. Two opposite ends of the connecting bar are pivotally linked between the base and the slider. One end of the first swinging arm is pivotally connected to the slider, and the other end of the first swinging arm is slidably and rotatably connected to the first gliding groove.

Another object of the present invention is to provide a linkage mechanism for opening and closing an inputting tray and an outputting tray together adapted to an automatic document feeder. The linkage mechanism for opening and closing the inputting tray and the outputting tray together includes a base, an outputting tray rotatably connected to a rear of the base, an inputting tray pivotally connected to a top of the base, at least one first linkage bar linked between the intermediate outputting tray and the inputting tray, and at least one second linkage bar linked between the base and the terminal outputting tray. The outputting tray includes an intermediate outputting tray pivotally connected to the rear of the base, and a terminal outputting tray pivotally connected to a tail end of the intermediate outputting tray. Two ends of the at least one first linkage bar are pivotally connected to one side of the inputting tray and one side of the intermediate outputting tray, respectively. Two ends of the at least one second linkage bar are pivotally connected to one side of the base and one side of the terminal outputting tray, respectively. When the inputting tray and the outputting tray are in closed states, the inputting tray is covered on an upper surface of the base, the intermediate outputting tray is covered to a rear surface of the base which is located at a downstream of the base, and the terminal outputting tray is covered to a top surface of the inputting tray. When the inputting tray is lifted upward, the intermediate outputting tray is driven by the at least one first linkage bar to move consecutively, and the intermediate outputting tray is lifted upward in a downstream direction, the terminal outputting tray is driven by the at least one second linkage bar to move consecutively, the terminal outputting tray is lifted upward, and the terminal outputting tray is away from the top of the inputting tray, so that the inputting tray is lifted upward.

As described above, the linkage mechanism for opening and closing the inputting tray and the outputting tray together includes the base, the inputting tray, the intermediate outputting tray, the terminal outputting tray, two first linkage bars and two second linkage bars. The two first linkage bars are linked between the intermediate outputting tray and the inputting tray, and the two second linkage bars are linked between the base and the terminal outputting tray, so when the inputting tray is opened or closed, the intermediate outputting tray and the terminal outputting tray are consecutively opened or closed via a linkage among the two first linkage bars, the intermediate outputting tray and the inputting tray, and a linkage among the two second linkage bars, the base and the terminal outputting tray. As a result, the linkage mechanism for opening and closing the inputting tray and the outputting tray together links the inputting tray and the outputting tray so as to ensure that the inputting tray is opened or closed along with the outputting tray.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
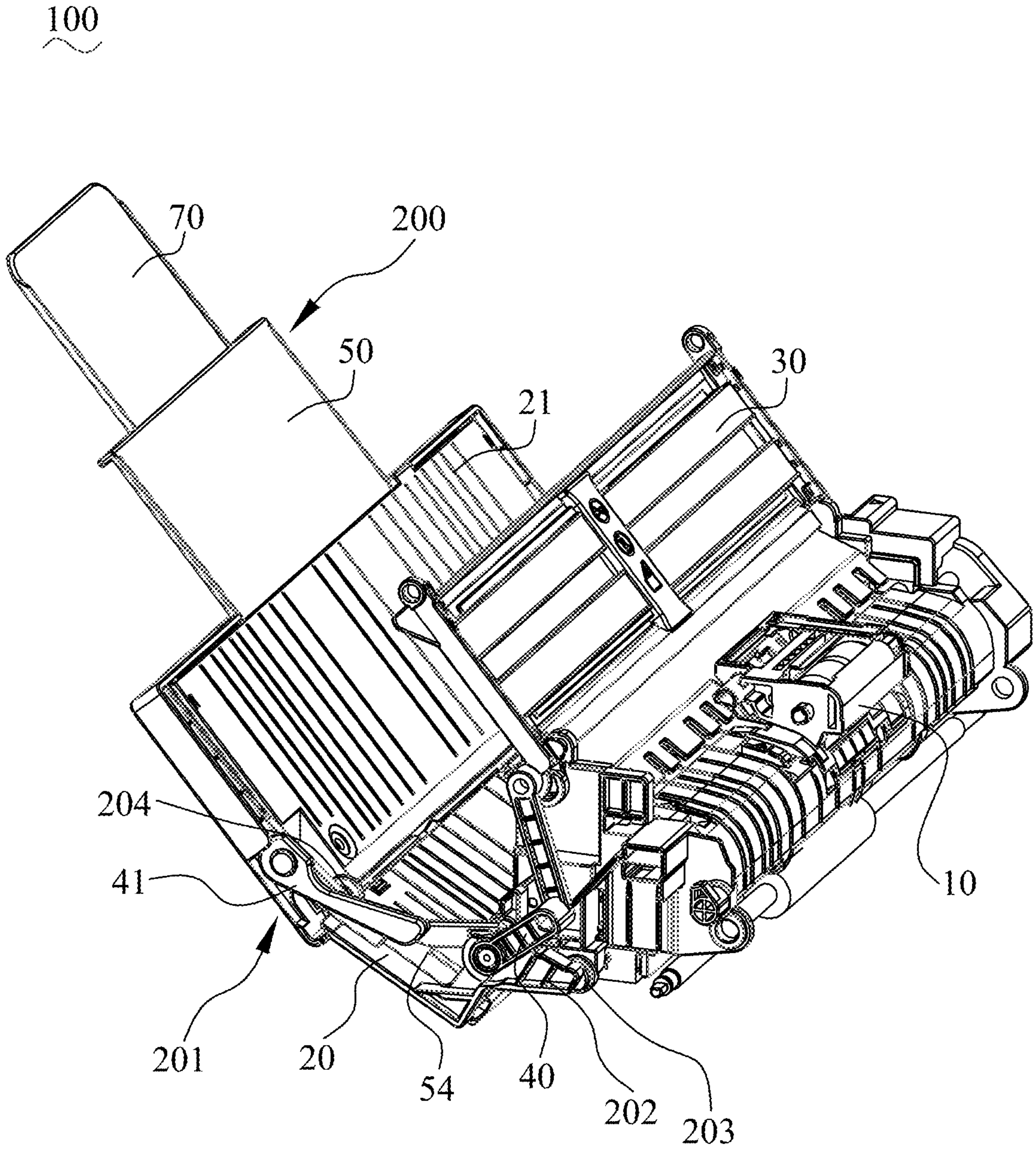
FIG. 1 is a perspective view of a linkage mechanism for opening and closing an inputting tray and an outputting tray together according to a first preferred embodiment of the present invention.
Figure 2:
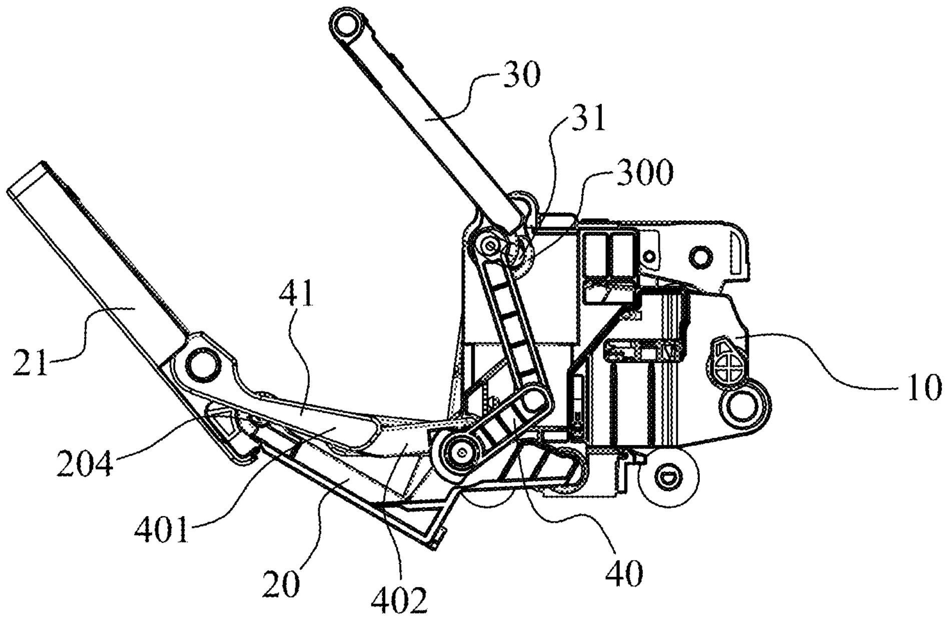
FIG. 2 is a side view of the linkage mechanism for opening and closing the inputting tray and the outputting tray together according to the first preferred embodiment of the present invention, wherein the linkage mechanism for opening and closing the inputting tray and the outputting tray together is in an opened status.

Referring to FIG. 1 and FIG. 2, a linkage mechanism for opening and closing an inputting tray and an outputting tray together 100 according to a first preferred embodiment of the present invention is shown. The linkage mechanism for opening and closing the inputting tray and the outputting tray together 100 is adapted to an automatic document feeder of a document processing machine (not shown). The linkage mechanism for opening and closing the inputting tray and the outputting tray together 100 includes a base 10, an inputting tray 30, at least one first linkage bar 40, at least one second linkage bar 41 and an outputting tray 201. In the first preferred embodiment, the outputting tray 201 includes an intermediate outputting tray 20 and a terminal outputting tray 21. The linkage mechanism for opening and closing the inputting tray and the outputting tray together 100 includes two first linkage bars 40 and two second linkage bars 41.

The base 10 is provided to mount components which include a motor, a paper feeding roller, a scanning unit, a printing unit or others. The components are mounted to the base 10 to be adapted to pick up paper or documents, separate the paper or the documents, convey the paper or the documents, scan the paper or the documents, or print the paper or the documents. The components are without being completely shown in this present invention. The intermediate outputting tray 20 is pivotally connected to a rear of the base 10. The terminal outputting tray 21 is pivotally connected to a tail end of the intermediate outputting tray 20. In this case, a bottom of the intermediate outputting tray 20 has a connecting arm 202. The connecting arm 202 is extended from the bottom of the intermediate outputting tray 20. A free end of the connecting arm 202 has a bottom shaft 203, and the bottom shaft 203 is pivotally connected to a bottom of the base 10. A top of the intermediate outputting tray 20 has a top shaft 204, and the top shaft 204 is pivotally connected to a bottom of the terminal outputting tray 21. In the first preferred embodiment, two sides of the bottom of the intermediate outputting tray 20 have two connecting arms 202.

The outputting tray 201 is rotatably connected to the rear of the base 10. The intermediate outputting tray 20 and the terminal outputting tray 21 are foldable, and the intermediate outputting tray 20 and the terminal outputting tray 21 lean against the base 10. The intermediate outputting tray 20 and the terminal outputting tray 21 are expandable to be located at the rear of the base 10 for receiving fed paper. The inputting tray 30 is pivotally connected to a top of the base 10. The inputting tray 30 is foldable, and the inputting tray 30 leans against the base 10. The inputting tray 30 is expandable to receive the paper which is to be fed. The inputting tray 30 and the outputting tray 201 are foldable with respect to the base 10. The inputting tray 30 has a cam portion 300 extended from a bottom of the inputting tray 30. The cam portion 300 has a rotating shaft 31 pivotally connected to the top of the base 10. An arc groove 32 is formed next to the rotating shaft 31. A sliding path of the arc groove 32 is coaxial with the rotating shaft 31, and one end of the at least one first linkage bar 40 is slidable and is rotatably connected in the arc groove 32. In the first preferred embodiment, the bottom of the inputting tray 30 has two cam portions 300.

The at least one first linkage bar 40 is linked between a middle of the connecting arm 202 of the intermediate outputting tray 20 and the inputting tray 30. Two ends of the at least one first linkage bar 40 are pivotally connected to one side of the inputting tray 30 and one side of the intermediate outputting tray 20, respectively. The two ends of the at least one first linkage bar 40 have an upper shaft 401 and a lower shaft 402. The upper shaft 401 and the lower shaft 402 are pivotally connected to the one side of the inputting tray 30 and one side of the middle of the connecting arm 202 of the intermediate outputting tray 20. The two first linkage bars 40 are linked between the middle of the connecting arm 202 of the intermediate outputting tray 20 and the inputting tray 30. The two first linkage bars 40 are pivotally disposed to two middles of the two connecting arms 202 of two sides of the intermediate outputting tray 20 and two sides of the inputting tray 30 to bring along the inputting tray 30 to be consecutively opened or closed when the outputting tray 201 is opened or closed. The at least one second linkage bar 41 is linked between the base 10 and the terminal outputting tray 21. Two ends of the at least one second linkage bar 41 are pivotally connected to one side of the base 10 and one side of the terminal outputting tray 21, respectively. The two second linkage bars 41 are linked between the base 10 and the terminal outputting tray 21. The two second linkage bars 41 are pivotally disposed to two sides of the base 10 and two sides of the terminal outputting tray 21 to consecutively open or close the terminal outputting tray 21 when the intermediate outputting tray 20 is opened or closed.

In order to describe the description of the present invention more conveniently, when the base 10 is placed in a ready-to-use state, a direction towards a top of the base 10 is defined as an upward direction. A downward direction is opposite to the upward direction. When the paper or a document is scanned or printed, a direction from which the paper or the document is fed is defined as an upstream direction. When the paper or the document is scanned or printed, a direction towards which the paper or the document is fed is defined as a downstream direction.

Figure 3:
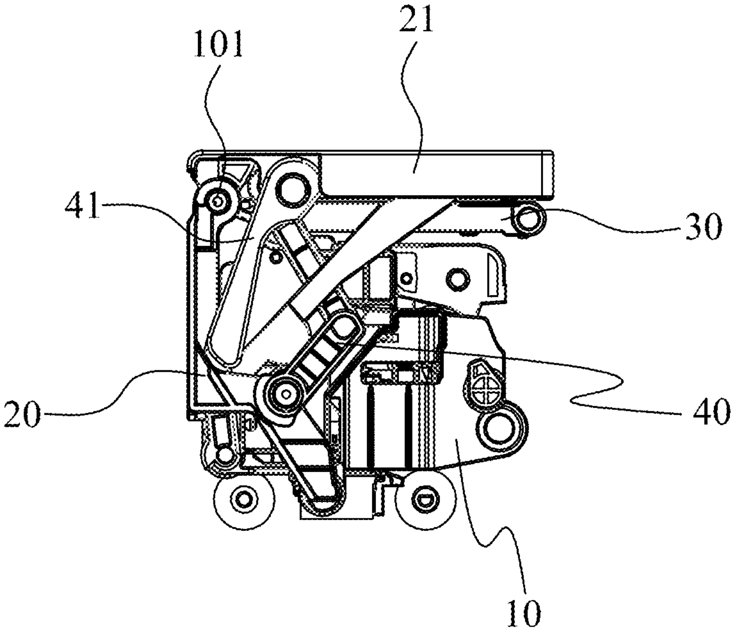
FIG. 3 is a side view of the linkage mechanism for opening and closing the inputting tray and the outputting tray together according to the first preferred embodiment of the present invention, wherein the linkage mechanism for opening and closing the inputting tray and the outputting tray together is in a closed status.
Figure 4:
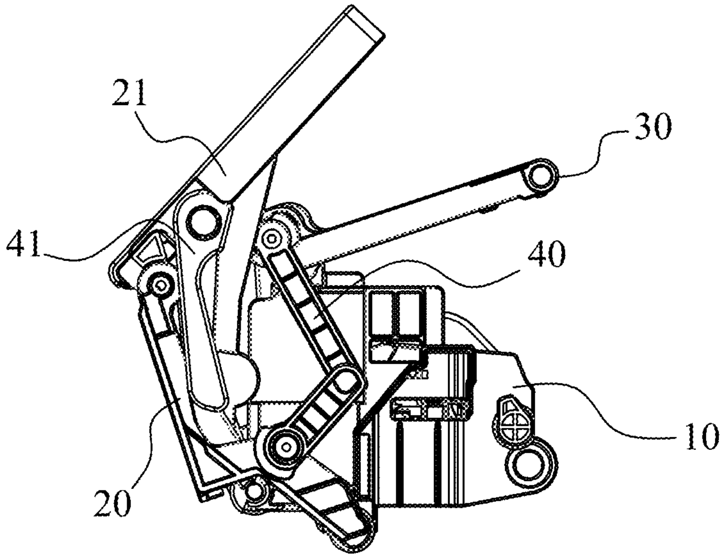
FIG. 4 is a side view of the linkage mechanism for opening and closing the inputting tray and the outputting tray together according to the first preferred embodiment of the present invention, wherein the linkage mechanism for opening and closing the inputting tray and the outputting tray together is in an opening status.

Referring to FIG. 1, FIG. 3 and FIG. 4, when the inputting tray 30 and the outputting tray 201 are in closed states, the inputting tray 30 is covered on an upper surface of the base 10, and the outputting tray 201 is covered to a rear surface of the base 10 and a top surface of the inputting tray 30. The intermediate outputting tray 20 is covered to the rear surface of the base 10 which is located at a downstream of the base 10, and the terminal outputting tray 21 is covered to the top surface of the inputting tray 30. In one situation, when the intermediate outputting tray 20 is rotated to become inclined by a user, the two first linkage bars 40 are driven with the intermediate outputting tray 20. So the two first linkage bars 40 are brought to move rearward and downward, and the inputting tray 30 is pulled by the two first linkage bars 40. The cam portion 300 is configured to receive a pulling force and to rotate the inputting tray 30. So the inputting tray 30 is lifted upward. In another situation, when the inputting tray 30 is lifted upward by the user, the intermediate outputting tray 20 is driven by the at least one first linkage bar 40 to move consecutively, and the intermediate outputting tray 20 is lifted upward in the downstream direction, meanwhile, the terminal outputting tray 21 is driven by the at least one second linkage bar 41 to move consecutively, the terminal outputting tray 21 is lifted upward, and the terminal outputting tray 21 is away from the top of the inputting tray 30, so that the inputting tray 30 is lifted upward without an obstruction.

When the inputting tray 30 is downward closed from an expandable state, the two first linkage bars 40 drive the intermediate outputting tray 20 to be closed in the upstream direction, and the two second linkage bars 41 lead the terminal outputting tray 21 to be closed downward to the top of the inputting tray 30.

Referring to FIG. 1 to FIG. 5, in order to ensure that the inputting tray 30 and the outputting tray 201 is lifted and closed correctly, two sides of the bottom of the inputting tray 30 connected to the downstream of the base 10 have the two cam portions 300. The two cam portions 300 have two inputting shafts 31 protruded towards each other. An axis of each inputting shaft 31 is away from a bottom surface of the inputting tray 30, so that the inputting tray 30 is flatly covered to the top of the base 10. The two cam portions 300 also define two arc grooves 32. The two arc grooves 32 are located at two outer sides of the two inputting shafts 31, respectively. Sliding paths of the two arc grooves 32 are coaxial with the two inputting shafts 31. The two upper shafts 401 of the two first linkage bars 40 are inserted into the two arc grooves 32 and are slided along the two arc grooves 32, so the two first linkage bars 40 are slidable, and the two upper shafts 401 of the two first linkage bars 40 are pivotally connected in the two arc grooves 32. Therefore, when the inputting tray 30 is lifted or closed, the two inputting shafts 31 are defined as a rotational axis of the inputting tray 30, the two arc grooves 32 provide two buffering spaces for the two first linkage bars 40, so when the inputting tray 30 swings, the two first linkage bars 40 and the intermediate outputting tray 20 are prevented from consecutively swinging unsmoothly.

Referring to FIG. 1 to FIG. 8, although the intermediate outputting tray 20 and the terminal outputting tray 21 are connected, and the intermediate outputting tray 20 and the terminal outputting tray 21 are provided in the present invention, a length of the foldable outputting tray 201 is short. In an actual use, the fed paper easily falls off from the outputting tray 201. A tail end of the terminal outputting tray 21 is further provided with an ejecting extension element 200 to carry the fed paper. The ejecting extension element 200 is disposed to the terminal outputting tray 21. In this preferred embodiment, the ejecting extension element 200 includes a first extension board 50, a first gliding groove 51, a slider 52, a sliding rail 53, a connecting bar 54 and a first swinging arm 60. The slider 52 is slidably disposed to the terminal outputting tray 21. The sliding rail 53 is positioned to the terminal outputting tray 21, and the sliding rail 53 is perpendicular to a pivot axis 101 between the intermediate outputting tray 20 and the terminal outputting tray 21. The top shaft 204 of the intermediate outputting tray 20 defines the pivot axis 101.

Referring to FIG. 1 to FIG. 10, the slider 52 is slidably disposed to the sliding rail 53. Two ends of the connecting bar 54 are pivotally connected between the intermediate outputting tray 20 and the slider 52. The connecting bar 54 is pivotally connected between the intermediate outputting tray 20 and the terminal outputting tray 21. The first extension board 50 is slidably disposed to the terminal outputting tray 21. A sliding path of the first extension board 50 is perpendicular to the pivot axis 101 of the intermediate outputting tray 20 and the terminal outputting tray 21. The first gliding groove 51 is defined in the first extension board 50. A sliding path of the first gliding groove 51 is perpendicular to the sliding path of the first extension board 50.

One end of the first swinging arm 60 is pivotally connected to the slider 52, and the other end of the first swinging arm 60 is slidably and rotatably connected to the first gliding groove 51 of the first extension board 50. The first swinging arm 60 includes a pivot portion 61, a driving portion 62 and an actuation portion 63. The pivot portion 61 is pivotally connected to the terminal outputting tray 21. The driving portion 62 is extended sideward from the pivot portion 61, and the driving portion 62 is pivotally connected to the slider 52. The actuation portion 63 is slantwise extended sideward and upward from the pivot portion 61, and the actuation portion 63 is slidably pivoted in the first gliding groove 51. In this preferred embodiment, the driving portion 62 defines a slideway 601, and the slider 52 is slidably connected in the slideway 601 of the driving portion 62.

In this preferred embodiment, the ejecting extension element 200 further includes a second extension board 70 slidably connected to a top of the first extension board 50, a second gliding groove 71, a first block 72, a second block 73 and a second swinging arm 80. A sliding path of the second extension board 70 is parallel to the sliding path of the first extension board 50. The second gliding groove 71 is defined at the second extension board 70. A sliding path of the second gliding groove 71 is perpendicular to the sliding path of the second extension board 70. One end of the second swinging arm 80 is pivotally connected to the terminal outputting tray 21, the other end of the second swinging arm 80 is slidably and rotatably connected to the second extension board 70, and the other end of the second swinging arm 80 is slidably connected in the second gliding groove 71. The first block 72 is disposed to the first extension board 50, and the first block 72 is positioned to an upstream of the second swinging arm 80. The second block 73 is disposed at the first extension board 50, and the second block 73 is positioned to a downstream of the second swinging arm 80.

Figure 8:
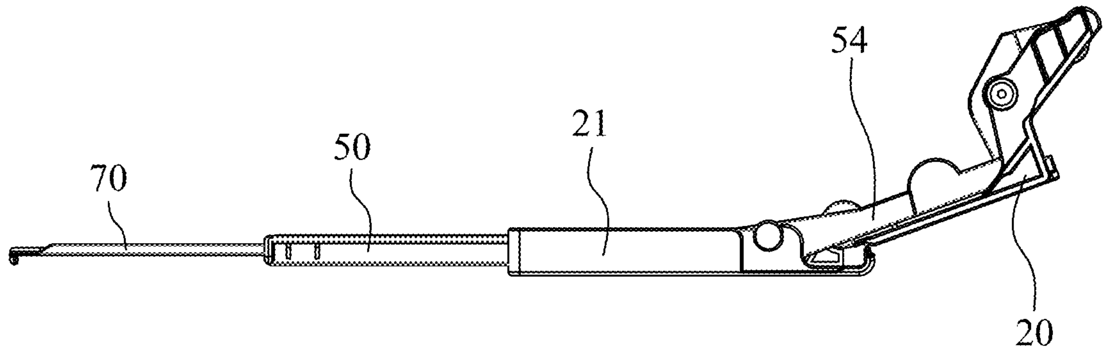
FIG. 8 is another side view showing the opened status of the ejecting extension element according to the first preferred embodiment of the present invention.
Figure 10:
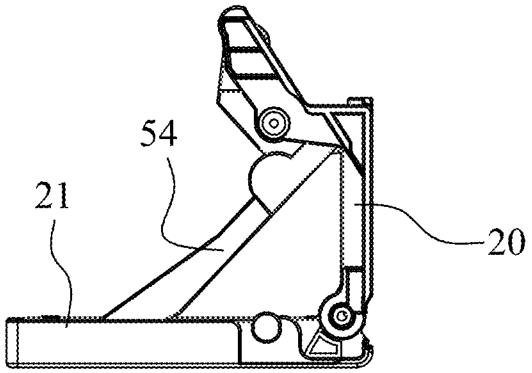
FIG. 10 is a side view showing the closed status of the ejecting extension element according to the first preferred embodiment of the present invention.
Figure 12:
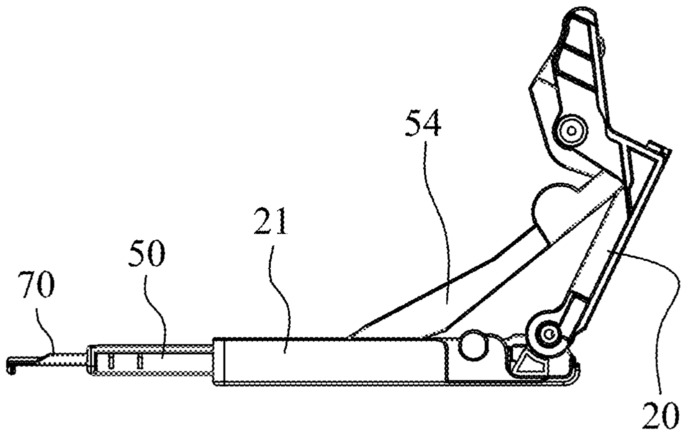
FIG. 12 is a side view showing the opening status of the ejecting extension element according to the first preferred embodiment of the present invention.

Referring to FIG. 8, FIG. 10 and FIG. 12, when the intermediate outputting tray 20 and the terminal outputting tray 21 are expandable from the folded state of the intermediate outputting tray 20 and the terminal outputting tray 21, a distance between the intermediate outputting tray 20 and the terminal outputting tray 21 is increased, an angle between the intermediate outputting tray 20 and the terminal outputting tray 21 is increased, the connecting bar 54 pulls the slider 52 to slide towards the base 10.

Figure 7:
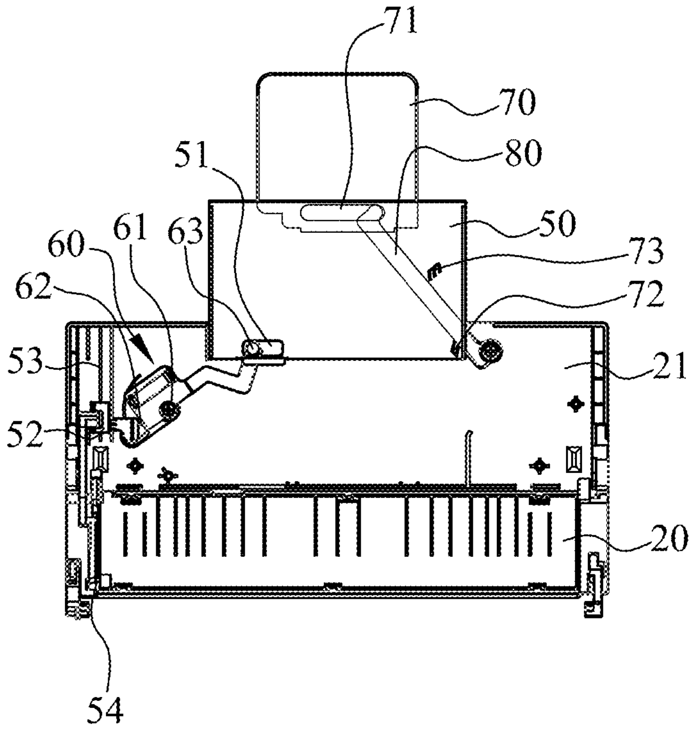
FIG. 7 is a schematic diagram showing the opened status of the ejecting extension element according to the first preferred embodiment of the present invention.
Figure 9:
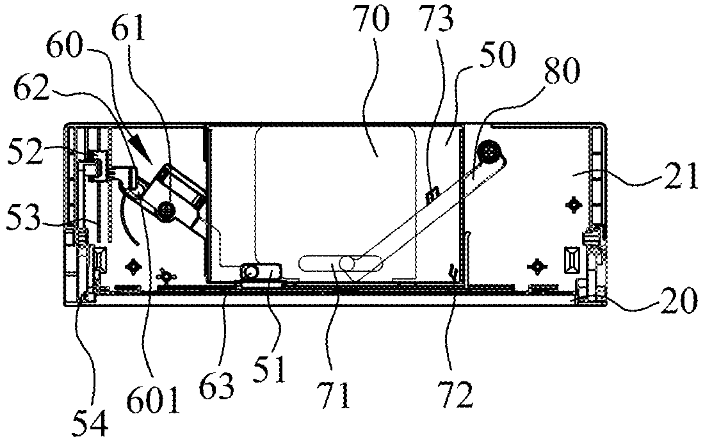
FIG. 9 is a schematic diagram showing a closed status of the ejecting extension element according to the first preferred embodiment of the present invention.
Figure 11:
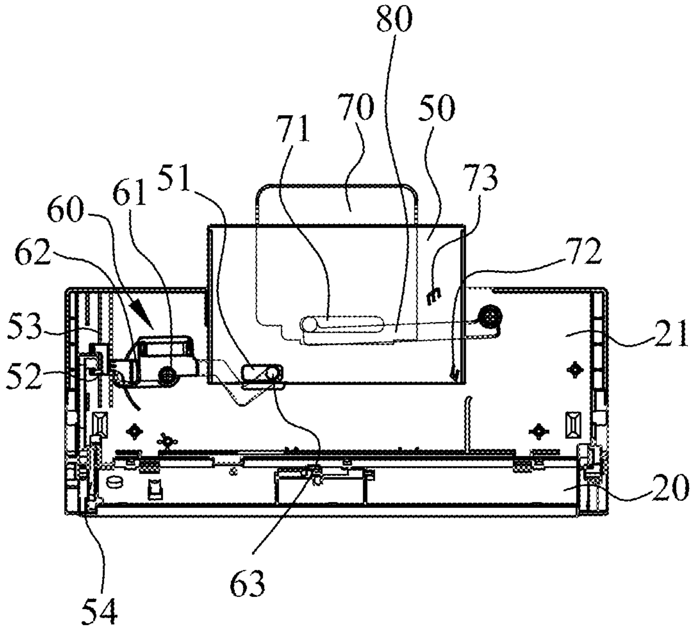
FIG. 11 is a schematic diagram showing an opening status of the ejecting extension element according to the first preferred embodiment of the present invention.

Referring to FIG. 7, FIG. 9 and FIG. 11, when the connecting bar 54 pulls the slider 52 to slide towards the base 10, the first swinging arm 60 is synchronously driven to rotate clockwise around the pivot portion 61, at the moment, the actuation portion 63 pushes the first extension board 50 to slide towards the downstream direction, an end wall of the first gliding groove 51 pushes against the first extension board 50 to slide in the downstream direction, a lateral displacement of the actuation portion 63 between the two end walls of the first gliding groove 51 is offsetted via the first gliding groove 51.

When the first extension board 50 slides towards the downstream direction, the first block 72 which is disposed to the first extension board 50 pushes against the second swinging arm 80 to make the second swinging arm 80 rotate counterclockwise, at the moment, the second swinging arm 80 pushes the second extension board 70 to slide towards the downstream direction, and a lateral displacement of the second swinging arm 80 is offsetted via the second gliding groove 71.

Referring to FIG. 7 to FIG. 12, when the intermediate outputting tray 20 and the terminal outputting tray 21 are folded from the expandable status of the intermediate outputting tray 20 and the terminal outputting tray 21, a distance between the intermediate outputting tray 20 and the terminal outputting tray 21 is decreased, an angle between the intermediate outputting tray 20 and the terminal outputting tray 21 is decreased, and the connecting bar 54 pushes the slider 52 to slide away from the base 10 and the intermediate outputting tray 20. At the moment, the first swinging arm 60 rotates counterclockwise, and the first swinging arm 60 drives the first extension board 50 to slide towards the upstream direction, the second block 73 which is disposed on the first extension board 50 pushes against the second swinging arm 80 to make the second swinging arm

80 rotate in a clockwise direction, in the meanwhile, the second swinging arm 80 pushes against the second extension board 70 to slide towards the upstream direction, the lateral displacement of the second swinging arm 80 is offsetted via the second gliding groove 71.

Figure 13:
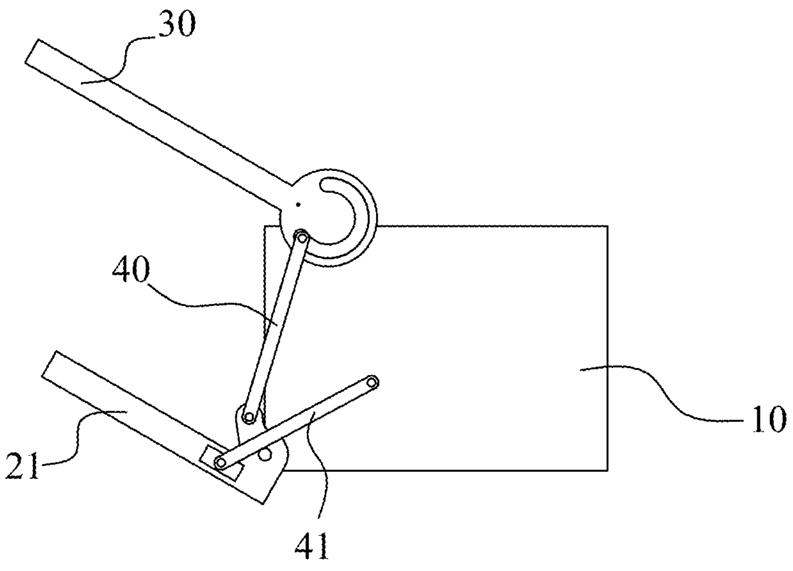
FIG. 13 is a side view of the linkage mechanism for opening and closing the inputting tray and the outputting tray together according to a second preferred embodiment of the present invention, wherein the linkage mechanism for opening and closing the inputting tray and the outputting tray together is in the opened status.
Figure 14:
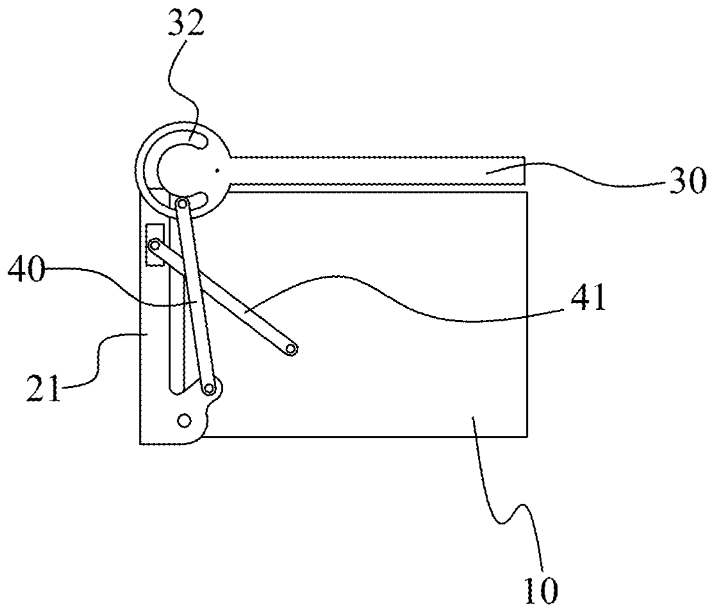
FIG. 14 is a side view of the linkage mechanism for opening and closing the inputting tray and the outputting tray together of FIG. 13, wherein the linkage mechanism for opening and closing the inputting tray and the outputting tray together is in the closed status.
Figure 15:
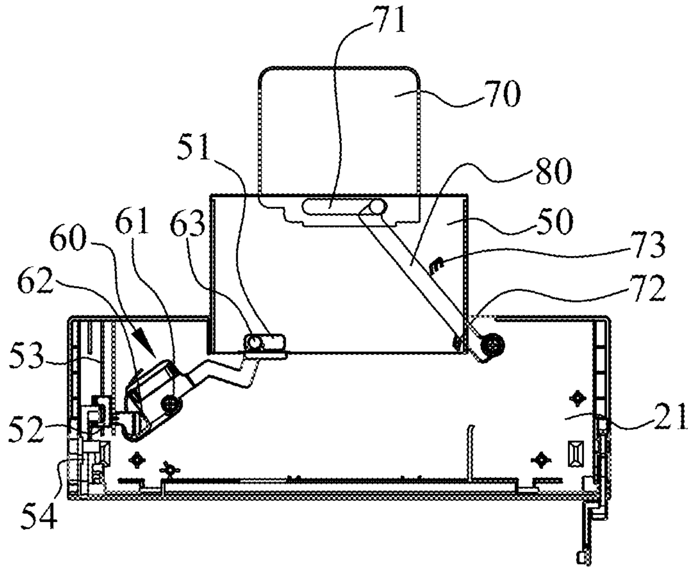
FIG. 15 is a schematic diagram showing the opened status of the ejecting extension element of the linkage mechanism for opening and closing the inputting tray and the outputting tray together of FIG. 13.
Figure 16:
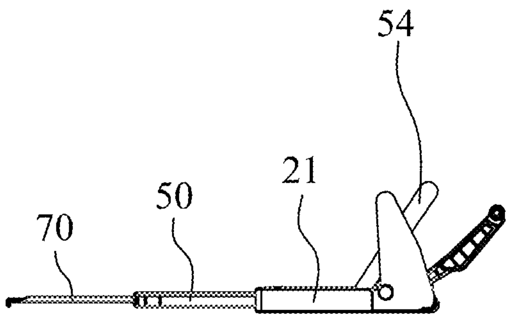
FIG. 16 is a side view showing the opened status of the ejecting extension element of the linkage mechanism for opening and closing the inputting tray and the outputting tray together of FIG. 13.
Figure 17:
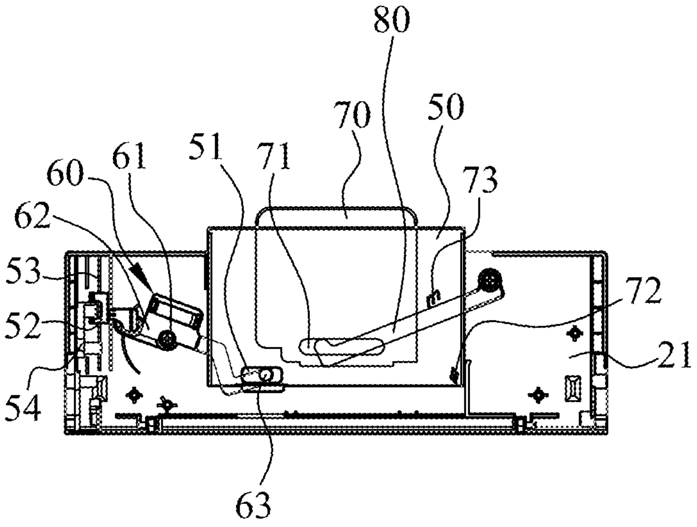
FIG. 17 is a schematic diagram showing the opening status of the ejecting extension element of the linkage mechanism for opening and closing the inputting tray and the outputting tray together of FIG. 13.
Figure 18:
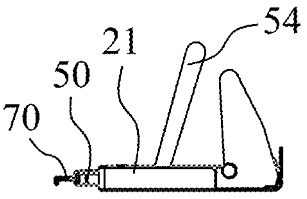
FIG. 18 is a side view showing the opening status of the ejecting extension element of the linkage mechanism for opening and closing the inputting tray and the outputting tray together of FIG. 13.
Figure 19:
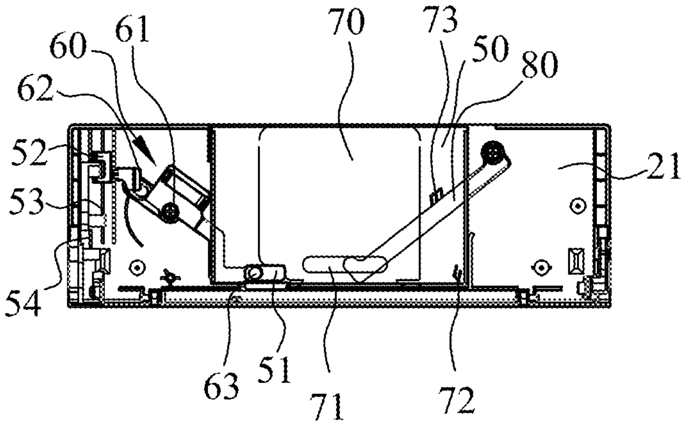
FIG. 19 is a schematic diagram showing the closed status of the ejecting extension element of the linkage mechanism for opening and closing the inputting tray and the outputting tray together of FIG. 13.
Figure 20:
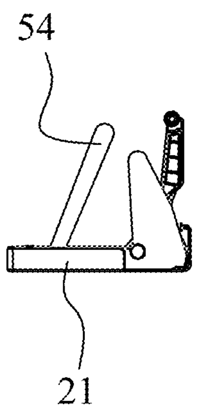
FIG. 20 is a side view showing the closed status of the ejecting extension element of the linkage mechanism for opening and closing the inputting tray and the outputting tray together of FIG. 13.

Referring to FIG. 1, FIG. 13 and FIG. 14, the linkage mechanism for opening and closing the inputting tray and the outputting tray together 100 according to a second preferred embodiment of the present invention is shown. In this second preferred embodiment, the linkage mechanism for opening and closing the inputting tray and the outputting tray together 100 includes the base 10, the outputting tray 201 which is the terminal outputting tray 21, the inputting tray 30, the at least one first linkage bar 40 and the at least one second linkage bar 41. Specifically, the linkage mechanism for opening and closing the inputting tray and the outputting tray together 100 includes the two first linkage bars 40 and the two second linkage bars 41. The base 10 is configured for mounting the components which include the motor, the paper feeding roller, the scanning unit, the printing unit or others, so that the paper or the document is scanned, printed or processed in other ways. The components are without being completely shown in this present invention.

The terminal outputting tray 21 is rotatably connected to the rear of the base 10. The terminal outputting tray 21 is foldable, the terminal outputting tray 21 leans against the base 10, and the terminal outputting tray 21 is expandable to be located at the rear of the base 10 for receiving the fed paper. The inputting tray 30 is pivotally connected to the top of the base 10. The inputting tray 30 is foldable, and the inputting tray 30 leans against the base 10. The inputting tray 30 is expandable to receive the paper which is to be fed. The at least one first linkage bar 40 is linked between the inputting tray 30 and the terminal outputting tray 21, the two ends of the at least one first linkage bar 40 are pivotally connected to the one side of the inputting tray 30 and the one side of the terminal outputting tray 21, respectively. The two first linkage bars 40 are linked between the terminal outputting tray 21 and the inputting tray 30. The two first linkage bars 40 are pivotally disposed to the two sides of the inputting tray 30 and the two sides of the terminal outputting tray 21 to consecutively open or close the terminal outputting tray 21 when the inputting tray 30 is opened or closed. The at least one second linkage bar 41 is linked between the base 10 and the terminal outputting tray 21, the two ends of the at least one second linkage bar 41 are pivotally connected to the one side of the base 10 and the one side of the terminal outputting tray 21, respectively. The two second linkage bars 41 are linked between the terminal outputting tray 21 and the base 10. The two second linkage bars 41 are pivotally disposed to the two sides of the terminal outputting tray 21 and the two sides of the base 10.

When the inputting tray 30 and the terminal outputting tray 21 are in the closed states, the inputting tray 30 is covered to the upper surface of the base 10, and the terminal outputting tray 21 is covered to the rear surface of the base 10 which is located at the downstream of the base 10. When the inputting tray 30 is lifted upward, the two first linkage bars 40 drive the terminal outputting tray 21 to lift upward and towards the downstream direction. Conversely, when the inputting tray 30 is covered downward from the expandable state, the two first linkage bars 40 drive the terminal outputting tray 21 to be closed towards the upstream direction.

Figure 5:
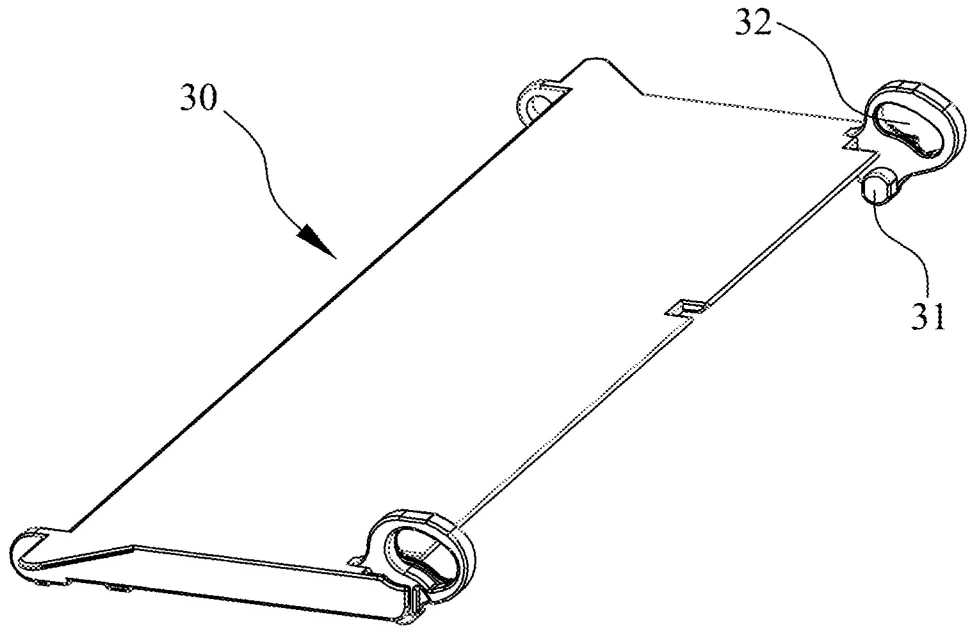
FIG. 5 is a perspective view of the inputting tray of the linkage mechanism for opening and closing the inputting tray and the outputting tray together in accordance with the first preferred embodiment of the present invention.
Figure 6:
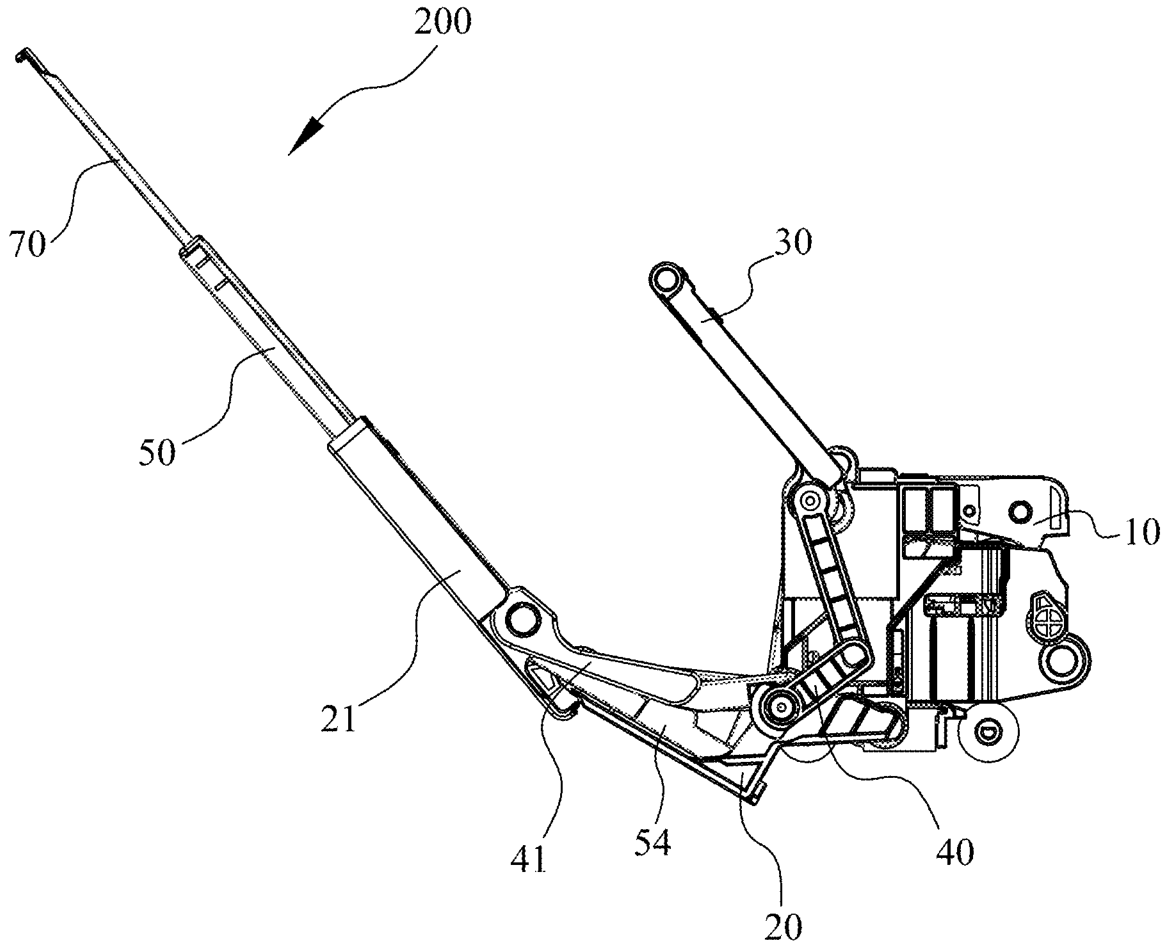
FIG. 6 is a side view of the linkage mechanism for opening and closing the inputting tray and the outputting tray together, wherein an ejecting extension element of the linkage mechanism for opening and closing the inputting tray and the outputting tray together is in an opened status according to the first preferred embodiment of the present invention.

Referring to FIG. 5, FIG. 13 and FIG. 14, in order to ensure that the inputting tray 30 and the terminal outputting tray 21 act correctly when the inputting tray 30 and the terminal outputting tray 21 are opened and closed, the two sides of one end of the inputting tray 30 connected to the downstream of the base 10 are provided with the two inputting shafts 31, and the shaft center of each inputting shaft 31 is away from the bottom surface of the inputting tray 30, so that the inputting tray 30 is flatly covered to the top of the base 10. The two sides of the one end edge of the inputting tray 30 connected to the downstream of the base 10 define the two arc grooves 32. The sliding paths of the two arc grooves 32 are coaxial with the two inputting shafts 31. The two first linkage bars 40 are slidable, and the two first linkage bars 40 are pivotally connected in the two arc grooves 32. Therefore, when the inputting tray 30 is lifted or closed, the two inputting shafts 31 are defined as the centrality of the inputting tray 30, the two arc grooves 32 provide the two buffering spaces for the two first linkage bars 40, so when the inputting tray 30 swings, the two first linkage bars 40 and the intermediate outputting tray 20 are prevented from consecutively swinging unsmoothly.

Referring to FIG. 6, FIG. 15 to FIG. 20, in this preferred embodiment, the tail end of the terminal outputting tray 21 is further provided with the ejecting extension element 200 to carry the fed paper. The ejecting extension element 200 is disposed to the terminal outputting tray 21. The ejecting extension element 200 includes the first extension board 50, the first gliding groove 51, the slider 52, the sliding rail 53, the connecting bar 54 and the first swinging arm 60. The sliding rail 53 is positioned to the terminal outputting tray 21, and the sliding rail 53 is perpendicular to the pivot axis 101 between the base 10 and the terminal outputting tray 21. The slider 52 is slidably disposed to the sliding rail 53. The slider 52 is slidably disposed to the terminal outputting tray 21. Two opposite ends of the connecting bar 54 are pivotally linked between the base 10 and the slider 52. The first extension board 50 is slidably disposed to the terminal outputting tray 21. The sliding path of the first extension board 50 is perpendicular to the pivot axis 101 of the base 10 and the terminal outputting tray 21. The first gliding groove 51 is defined in the first extension board 50. The sliding path of the first gliding groove 51 is perpendicular to the sliding path of the first extension board 50.

The first swinging arm 60 includes the pivot portion 61, the driving portion 62 and the actuation portion 63. The pivot portion 61 is pivotally connected to the terminal outputting tray 21. The driving portion 62 is extended sideward from the pivot portion 61, and the driving portion 62 is pivotally connected to the slider 52. The actuation portion 63 is slantwise extended sideward and upward from the pivot portion 61, and the actuation portion 63 is slidably pivoted in the first gliding groove 51. In this preferred embodiment, the driving portion 62 defines the slideway 601. The slider 52 is slidably connected in the slideway 601 of the driving portion 62.

In this preferred embodiment, the ejecting extension element 200 further includes the second extension board 70 slidably connected to the top of the first extension board 50, the second gliding groove 71, the first block 72, the second block 73 and the second swinging arm 80. The sliding path of the second extension board 70 is parallel to the sliding path of the first extension board 50. The second gliding groove 71 is defined at the second extension board 70. The sliding path of the second gliding groove 71 is perpendicular to the sliding path of the second extension board 70. One end of the second swinging arm 80 is pivotally connected to the terminal outputting tray 21, and the other end of the second swinging arm 80 is slidably connected in the second gliding groove 71. The first block 72 is disposed to the first extension board 50, and the first block 72 is positioned to the upstream of the second swinging arm 80. The second block 73 is disposed at the first extension board 50, and the second block 73 is positioned to the downstream of the second swinging arm 80.

Referring to FIG. 13 to FIG. 18, when the terminal outputting tray 21 is expanded from the folded status, the distance between the base 10 and the terminal outputting tray 21 is increased, and thus the connecting bar 54 pulls the slider 52 to slide towards the base 10.

When the connecting bar 54 pulls the slider 52 to slide towards the base 10, the connecting bar 54 synchronously drives the first swinging arm 60 to rotate in the clockwise direction around the pivot portion 61, at the moment, the actuation portion 63 pushes the first extension board 50 to slide in the downstream direction, the end wall of the first gliding groove 51 pushes against the first extension board 50 to slide in the downstream direction, and the lateral displacement of the actuation portion 63 is offsetted via the first gliding groove 51.

When the first extension board 50 slides in the downstream direction, the first block 72 which is disposed to the first extension board 50 pushes against the second swinging arm 80 to make the second swinging arm 80 rotate in the counterclockwise direction, at the moment, the second swinging arm 80 pushes the second extension board 70 to slide in the downstream direction, and the lateral displacement of the second swinging arm 80 is offsetted via the second gliding groove 71.

Referring to FIG. 1, FIG. 17, FIG. 18, FIG. 19 and FIG. 20, when the base 10 and the terminal outputting tray 21 are folded from an expandable status of the base 10 and the terminal outputting tray 21, the distance between the base 10 and the terminal outputting tray 21 is decreased, and the connecting bar 54 pulls the slider 52 to slide away from the base 10. Meanwhile the first swinging arm 60 rotates in the counterclockwise direction, and the first swinging arm 60 drives the first extension board 50 to slide in the upstream direction, the second block 73 which is disposed on the first extension board 50 pushes against the second swinging arm 80 to make the second swinging arm 80 rotate in the clockwise direction, then the second swinging arm 80 pushes against the second extension board 70 to slide in the upstream direction, and the lateral displacement of the second swinging arm 80 is offsetted via the second gliding groove 71.

As described above, the linkage mechanism for opening and closing the inputting tray and the outputting tray together 100 includes the base 10, the inputting tray 30, the intermediate outputting tray 20, the terminal outputting tray 21, the two first linkage bars 40 and the two second linkage bars 41. The two first linkage bars 40 are linked between the intermediate outputting tray 20 and the inputting tray 30, and the two second linkage bars 41 are linked between the base 10 and the terminal outputting tray 21, so when the inputting tray 30 is opened or closed, the intermediate outputting tray 20 and the terminal outputting tray 21 are consecutively opened or closed via a linkage among the two first linkage bars 40, the intermediate outputting tray 20 and the inputting tray 30, and a linkage among the two second linkage bars 41, the base 10 and the terminal outputting tray 21. As a result, the linkage mechanism for opening and closing the inputting tray and the outputting tray together 100 links the inputting tray 30 and the outputting tray 201 so as to ensure that the inputting tray 30 is opened or closed along with the outputting tray 201.

What is claimed is:

1. A linkage mechanism for opening and closing an inputting tray and an outputting tray together, comprising:
- a base;
- an outputting tray including
  - an intermediate outputting tray pivotally connected to a rear of the base, and
  - a terminal outputting tray pivotally connected to a tail end of the intermediate outputting tray;
- an inputting tray pivotally connected to a top of the base;
- at least one first linkage bar linked between the intermediate outputting tray and the inputting tray, two ends of the at least one first linkage bar being pivotally connected to one side of the inputting tray and one side of the intermediate outputting tray, respectively; and
- at least one second linkage bar linked between the base and the terminal outputting tray, two ends of the at least one second linkage bar being pivotally connected to one side of the base and one side of the terminal outputting tray, respectively,
- wherein the inputting tray has a cam portion extended from a bottom of the inputting tray, the cam portion has a rotating shaft pivotally connected to the top of the base, an arc groove is formed next to the rotating shaft, a sliding path of the arc groove is coaxial with the rotating shaft, and one end of the at least one first linkage bar is slidable and is rotatably connected in the arc groove.

2. The linkage mechanism for opening and closing the inputting tray and the outputting tray together as claimed in claim 1, wherein the linkage mechanism for opening and closing the inputting tray and the outputting tray together includes two first linkage bars, the two first linkage bars are pivotally disposed to two sides of the intermediate outputting tray and two sides of the inputting tray to bring along the inputting tray to be consecutively opened or closed when the outputting tray is opened or closed.

3. The linkage mechanism for opening and closing the inputting tray and the outputting tray together as claimed in claim 1, wherein the linkage mechanism for opening and closing the inputting tray and the outputting tray together includes two second linkage bars, the two second linkage bars are pivotally disposed to two sides of the base and two sides of the terminal outputting tray to consecutively open or close the terminal outputting tray when the intermediate outputting tray is opened or closed.

4. The linkage mechanism for opening and closing the inputting tray and the outputting tray together as claimed in claim 1, wherein when the inputting tray and the outputting tray are in closed states, the inputting tray is covered on an upper surface of the base, the intermediate outputting tray is covered to a rear surface of the base which is located at a downstream of the base, and the terminal outputting tray is covered to a top surface of the inputting tray.

5. The linkage mechanism for opening and closing the inputting tray and the outputting tray together as claimed in claim 1, wherein two sides of the bottom of the inputting tray connected to a downstream of the base have two cam portions, the two cam portions have two inputting shafts protruded towards each other, the two cam portions define two arc grooves, the two arc grooves are located at two outer sides of the two inputting shafts, respectively, sliding paths of the two arc grooves are coaxial with the two inputting shafts, the linkage mechanism for opening and closing the inputting tray and the outputting tray together includes two first linkage bars, the two first linkage bars are slidable, and the two first linkage bars are pivotally connected in the two arc grooves.

6. The linkage mechanism for opening and closing the inputting tray and the outputting tray together as claimed in claim 1, wherein a tail end of the terminal outputting tray is provided with an ejecting extension element, the ejecting extension element includes a first extension board, a first gliding groove, a slider, a connecting bar and a first swinging arm, the first gliding groove is defined in the first extension board, the slider is slidably disposed to the terminal outputting tray, two ends of the connecting bar are pivotally connected between the intermediate outputting tray and the slider, the first extension board is slidably disposed to the terminal outputting tray, a sliding path of the first extension board is perpendicular to a pivot axis of the intermediate outputting tray and the terminal outputting tray, one end of the first swinging arm is pivotally connected to the slider, and the other end of the first swinging arm is slidably and rotatably connected to the first gliding groove of the first extension board.

7. The linkage mechanism for opening and closing the inputting tray and the outputting tray together as claimed in claim 6, wherein the ejecting extension element includes a sliding rail, the sliding rail is positioned to the terminal outputting tray, and the sliding rail is perpendicular to the pivot axis between the intermediate outputting tray and the terminal outputting tray, the slider is slidably disposed to the sliding rail.

8. The linkage mechanism for opening and closing the inputting tray and the outputting tray together as claimed in claim 6, wherein a sliding path of the first gliding groove is perpendicular to the sliding path of the first extension board, the first swinging arm includes a pivot portion pivotally connected to the terminal outputting tray, a driving portion extended sideward from the pivot portion, and an actuation portion slantwise extended sideward and upward from the pivot portion, the driving portion is pivotally connected to the slider, the actuation portion is slidably pivoted in the first gliding groove.

9. The linkage mechanism for opening and closing the inputting tray and the outputting tray together as claimed in claim 6, wherein the ejecting extension element further includes a second extension board slidably connected to a top of the first extension board, a first block, a second block and a second swinging arm, a sliding path of the second extension board is parallel to the sliding path of the first extension board, one end of the second swinging arm is pivotally connected to the terminal outputting tray, and the other end of the second swinging arm is slidably and rotatably connected to the second extension board, the first block is disposed to the first extension board, and the first block is positioned to an upstream of the second swinging arm, the second block is disposed at the first extension board, and the second block is positioned to a downstream of the second swinging arm.

10. The linkage mechanism for opening and closing the inputting tray and the outputting tray together as claimed in claim 9, wherein the ejecting extension element further includes a second gliding groove, the second gliding groove is defined at the second extension board, a sliding path of the second gliding groove is perpendicular to the sliding path of the second extension board, the one end of the second swinging arm is pivotally connected to the terminal outputting tray, and the other end of the second swinging arm is slidably connected in the second gliding groove.

11. A linkage mechanism for opening and closing an inputting tray and an outputting tray together, comprising:

a base;

an outputting tray which is a terminal outputting tray rotatably connected to a rear of the base;

an inputting tray pivotally connected to a top of the base;

at least one first linkage bar linked between the inputting tray and the terminal outputting tray, two ends of the at least one first linkage bar being pivotally connected to one side of the inputting tray and one side of the terminal outputting tray, respectively;

at least one second linkage bar linked between the base and the terminal outputting tray, two ends of the at least one second linkage bar being pivotally connected to one side of the base and the one side of the terminal outputting tray, respectively; and an ejecting extension element disposed to the terminal outputting tray, the ejecting extension element including a first extension board slidably disposed to the terminal outputting tray, a sliding path of the first extension board being perpendicular to a pivot axis of the base and the terminal outputting tray, a first gliding groove defined in the first extension board, a slider slidably disposed to the terminal outputting tray, a connecting bar, two opposite ends of the connecting bar being pivotally linked between the base and the slider, and a first swinging arm, one end of the first swinging arm being pivotally connected to the slider, and the other end of the first swinging arm being slidably and rotatably connected to the first gliding groove.

12. The linkage mechanism for opening and closing the inputting tray and the outputting tray together as claimed in claim 11, wherein the linkage mechanism for opening and closing the inputting tray and the outputting tray together includes two first linkage bars, the two first linkage bars are pivotally disposed to two sides of the inputting tray and two sides of the terminal outputting tray to consecutively open or close the terminal outputting tray when the inputting tray is opened or closed.

13. The linkage mechanism for opening and closing the inputting tray and the outputting tray together as claimed in claim 11, wherein when the inputting tray and the outputting tray are in closed states, the inputting tray is covered on an upper surface of the base, and the outputting tray is covered to a rear surface of the base and a top surface of the inputting tray.

14. The linkage mechanism for opening and closing the inputting tray and the outputting tray together as claimed in claim 11, wherein the ejecting extension element includes a sliding rail, the sliding rail is positioned to the terminal outputting tray, and the sliding rail is perpendicular to the pivot axis between the base and the terminal outputting tray, the slider is slidably disposed to the sliding rail.

15. The linkage mechanism for opening and closing the inputting tray and the outputting tray together as claimed in claim 11, wherein a sliding path of the first gliding groove is perpendicular to the sliding path of the first extension board, the first swinging arm includes a pivot portion pivotally connected to the terminal outputting tray, a driving portion extended sideward from the pivot portion, and an actuation portion slantwise extended sideward and upward from the pivot portion, the driving portion is pivotally connected to the slider, the actuation portion is slidably pivoted in the first gliding groove.

16. The linkage mechanism for opening and closing the inputting tray and the outputting tray together as claimed in claim 11, wherein the ejecting extension element further includes a second extension board slidably connected to a top of the first extension board, a first block, a second block and a second swinging arm, a sliding path of the second extension board is parallel to the sliding path of the first extension board, one end of the second swinging arm is pivotally connected to the terminal outputting tray, and the other end of the second swinging arm is slidably and rotatably connected to the second extension board, the first block is disposed to the first extension board, and the first block is positioned to an upstream of the second swinging arm, the second block is disposed at the first extension board, and the second block is positioned to a downstream of the second swinging arm.

17. The linkage mechanism for opening and closing the inputting tray and the outputting tray together as claimed in claim 16, wherein the ejecting extension element further includes a second gliding groove, the second gliding groove is defined at the second extension board, a sliding path of the second gliding groove is perpendicular to the sliding path of the second extension board, the one end of the second swinging arm is pivotally connected to the terminal outputting tray, and the other end of the second swinging arm is slidably connected in the second gliding groove.

18. A linkage mechanism for opening and closing an inputting tray and an outputting tray together adapted to an automatic document feeder, comprising:

- a base;
- an outputting tray rotatably connected to a rear of the base, the outputting tray including
  - an intermediate outputting tray pivotally connected to the rear of the base, and
  - a terminal outputting tray pivotally connected to a tail end of the intermediate outputting tray;
- an inputting tray pivotally connected to a top of the base;
- at least one first linkage bar linked between the intermediate outputting tray and the inputting tray, two ends of the at least one first linkage bar being pivotally connected to one side of the inputting tray and one side of the intermediate outputting tray, respectively; and
- at least one second linkage bar linked between the base and the terminal outputting tray, two ends of the at least one second linkage bar being pivotally connected to one side of the base and one side of the terminal outputting tray, respectively,
- wherein when the inputting tray and the outputting tray are in closed states, the inputting tray is covered on an upper surface of the base, the intermediate outputting tray is covered to a rear surface of the base which is located at a downstream of the base, and the terminal outputting tray is covered to a top surface of the inputting tray, and
- wherein when the inputting tray is lifted upward, the intermediate outputting tray is driven by the at least one first linkage bar to move consecutively, and the intermediate outputting tray is lifted upward in a downstream direction, the terminal outputting tray is driven by the at least one second linkage bar to move consecutively, the terminal outputting tray is lifted upward, and the terminal outputting tray is away from the top of the inputting tray, so that the inputting tray is lifted upward.

19. The linkage mechanism for opening and closing the inputting tray and the outputting tray together as claimed in claim 18, wherein a tail end of the terminal outputting tray is provided with an ejecting extension element, the ejecting extension element includes a first extension board, a first gliding groove, a slider, a connecting bar and a first swinging arm, the first gliding groove is defined in the first extension board, the slider is slidably disposed to the terminal outputting tray, two ends of the connecting bar are pivotally connected between the intermediate outputting tray and the slider, the first extension board is slidably disposed to the terminal outputting tray, a sliding path of the first extension board is perpendicular to a pivot axis of the intermediate outputting tray and the terminal outputting tray, one end of the first swinging arm is pivotally connected to the slider, and the other end of the first swinging arm is slidably and rotatably connected to the first gliding groove of the first extension board.

20. The linkage mechanism for opening and closing the inputting tray and the outputting tray together as claimed in claim 19, wherein the ejecting extension element includes a sliding rail, the sliding rail is positioned to the terminal outputting tray, and the sliding rail is perpendicular to the pivot axis between the intermediate outputting tray and the terminal outputting tray, the slider is slidably disposed to the sliding rail.

* * * * *